(12) United States Patent
Brodnicki et al.

(10) Patent No.: US 10,808,826 B2
(45) Date of Patent: Oct. 20, 2020

(54) SYSTEMS AND METHODS FOR MONITORING LUBRICATION OF A DRIVE TRAIN

(71) Applicant: Bell Helicopter Textron Inc., Fort Worth, TX (US)

(72) Inventors: John Brodnicki, Midlothian, TX (US); Ron Woods, Weatherford, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 218 days.

(21) Appl. No.: 16/009,610

(22) Filed: Jun. 15, 2018

(65) Prior Publication Data

US 2019/0383382 A1    Dec. 19, 2019

(51) Int. Cl.

| | | |
|---|---|---|
| *G06F 11/30* | (2006.01) |
| *F16H 57/04* | (2010.01) |
| *G07C 5/08* | (2006.01) |
| *G07C 5/12* | (2006.01) |
| *B64D 43/00* | (2006.01) |
| *B64C 27/12* | (2006.01) |
| *B64D 45/00* | (2006.01) |
| *G05D 1/00* | (2006.01) |
| *G05D 1/08* | (2006.01) |
| *G05D 3/00* | (2006.01) |
| *G06F 7/00* | (2006.01) |
| *G06F 17/00* | (2019.01) |
| *G06F 7/70* | (2006.01) |

(Continued)

(52) U.S. Cl.
CPC ......... *F16H 57/0405* (2013.01); *B64C 27/12* (2013.01); *B64D 43/00* (2013.01); *B64D 45/00* (2013.01); *G07C 5/0808* (2013.01); *G07C 5/12* (2013.01); *B64D 2045/0085* (2013.01)

(58) Field of Classification Search
CPC ..... F16H 57/0405; B64C 27/12; B64D 43/00; B64D 45/00; G07C 5/0808; G07C 5/12
USPC .......................... 701/34, 4, 14, 34.4; 700/282
See application file for complete search history.

(56) References Cited

U.S. PATENT DOCUMENTS 6,009,356 A * 12/1999 Monroe ............. B64D 45/0015
                                                                701/14
8,985,517 B2    3/2015 Ehinger et al.
(Continued)

*Primary Examiner* — Mahmoud S Ismail
(74) *Attorney, Agent, or Firm* — Timmer Law Group, PLLC

(57) ABSTRACT

A system for monitoring lubrication of a drive train, including a lubricant pressure sensor to detect a pressure of the lubricant in the drive train and to provide a lubricant pressure signal; lubricant volume sensor to detect a volume of the lubricant in the drive train and to provide a lubricant volume signal; non-contact temperature sensor to detect a temperature of the drive train and to provide a non-contact temperature signal; and logic management system in communication with the lubricant pressure sensor, the lubricant volume sensor, and the non-contact temperature sensor; the logic management system configured to receive and process the lubricant pressure signal, the lubricant volume signal, and the non-contact temperature signal; wherein when the lubricant pressure signal reaches a predetermined minimum pressure level and the lubricant volume signal reaches a predetermined minimum volume level, the logic management system displays non-contact temperature measurement data to a display device.

24 Claims, 13 Drawing Sheets

(51) Int. Cl.
    *G06G 7/00*      (2006.01)
    *G06G 7/76*      (2006.01)
    *G05D 7/00*      (2006.01)
    *G05D 11/00*     (2006.01)

(56) References Cited

U.S. PATENT DOCUMENTS

| | | |
|---|---|---|
| 9,272,777 B2 | 3/2016 | McGlaun et al. |
| 9,354,635 B2 | 5/2016 | Shue |
| 9,683,652 B2 | 6/2017 | Poster |
| 9,816,601 B2 | 11/2017 | Poster |
| 9,891,110 B1 | 2/2018 | Pei et al. |
| 2009/0299535 A1* | 12/2009 | Delaloye ................ F01D 25/20 700/282 |
| 2010/0179712 A1* | 7/2010 | Pepitone .............. G07C 5/0808 701/14 |
| 2013/0184959 A1* | 7/2013 | Wendelsdorf ........... B64C 27/04 701/99 |
| 2014/0001307 A1 | 1/2014 | Ehinger et al. |
| 2017/0011612 A1* | 1/2017 | Jain ..................... G08B 21/182 |
| 2017/0089449 A1 | 3/2017 | Olson |
| 2017/0203837 A1* | 7/2017 | Gmirya .................. B64C 27/82 |
| 2018/0095005 A1 | 4/2018 | Burnett et al. |
| 2018/0165898 A1* | 6/2018 | Isom .................... G07C 5/0825 |
| 2019/0234892 A1* | 8/2019 | Harrington ............ G01K 3/005 |
| 2019/0264799 A1* | 8/2019 | Lewis ................. F16H 57/0431 |

\* cited by examiner

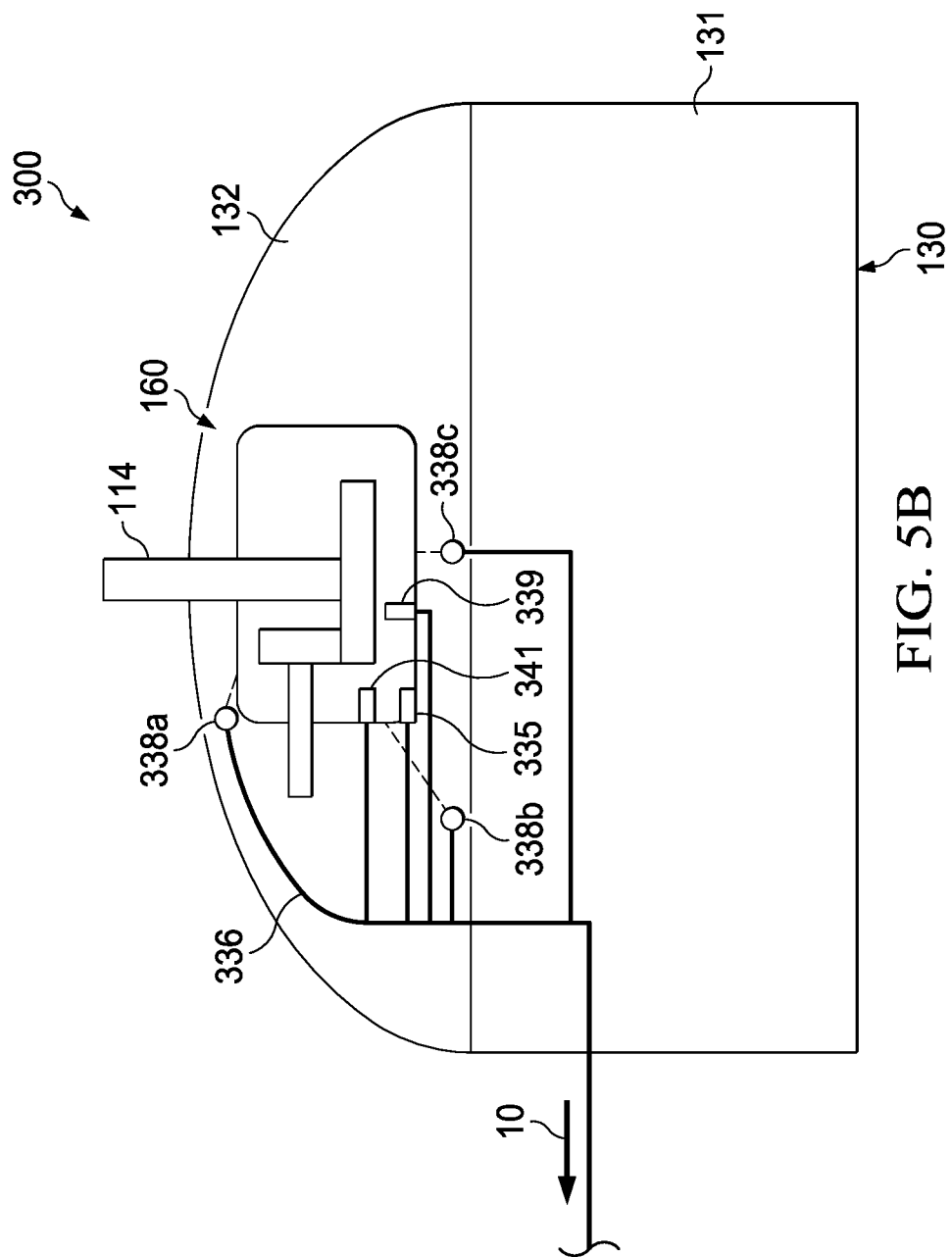

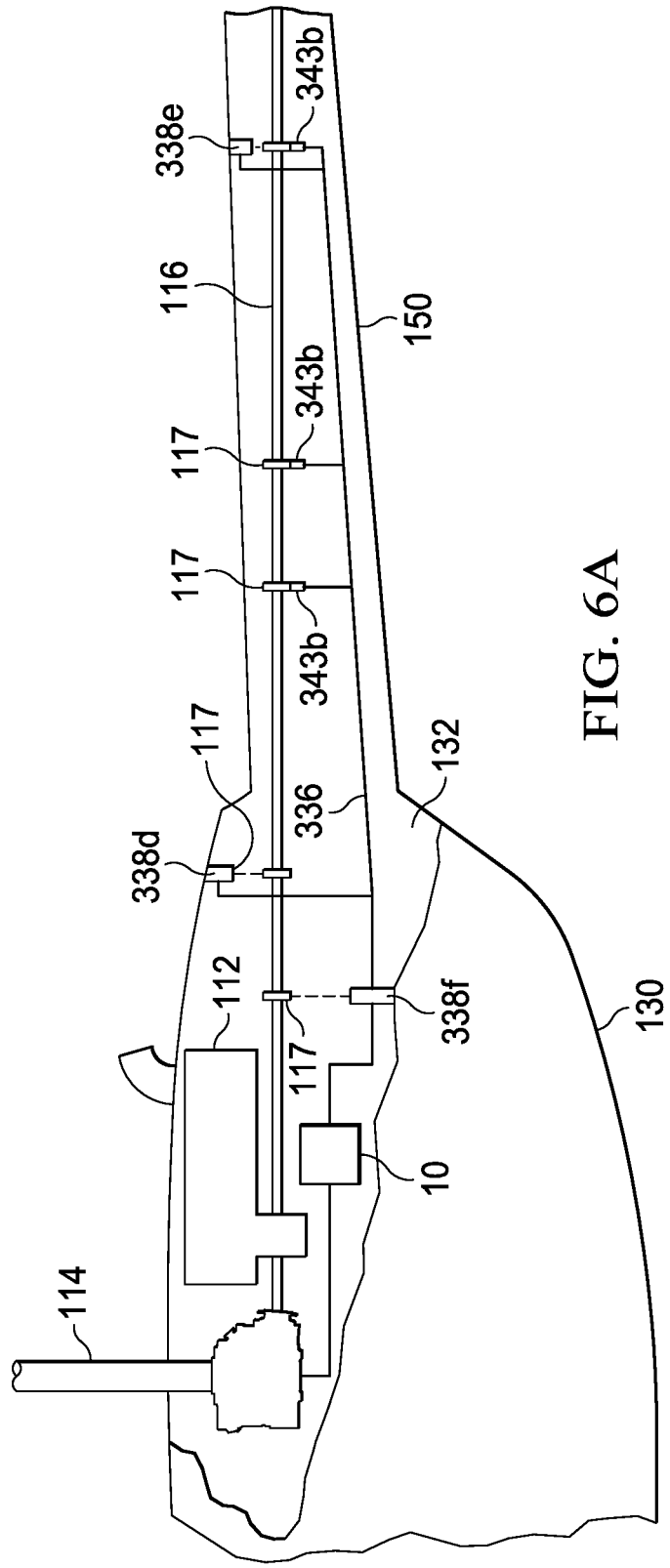

SYSTEMS AND METHODS FOR MONITORING LUBRICATION OF A DRIVE TRAIN

BACKGROUND

Technical Field

The present disclosure relates to generally to a rotorcraft, and more particularly, to systems and methods for monitoring lubrication of a drive train.

Description of Related Art

Aircraft drive trains include various components that produce and transfer power. For example, engines, drive shafts, and gearboxes are common components. Such components generate heat and require lubrication. Excessive levels of heat can cause premature failure and create safety risks. Proper lubrication of the components reduces heat production and assists in heat removal from within the components. Leakage of lubricant can cause excessive wear and overheating of components that can, in some instances, lead to catastrophic failure components in the drive train.

There is a need for systems and methods that monitor lubrication of drive train components.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

FIG. 5B is a schematic illustration of a system for monitoring lubrication of a rotorcraft gearbox including non-contact temperature sensors mounted externally;

FIG. 6A is a schematic illustration of a system for monitoring lubrication of the tail rotor drive shaft 116, according to an exemplary embodiment;

SUMMARY

Figure 1:
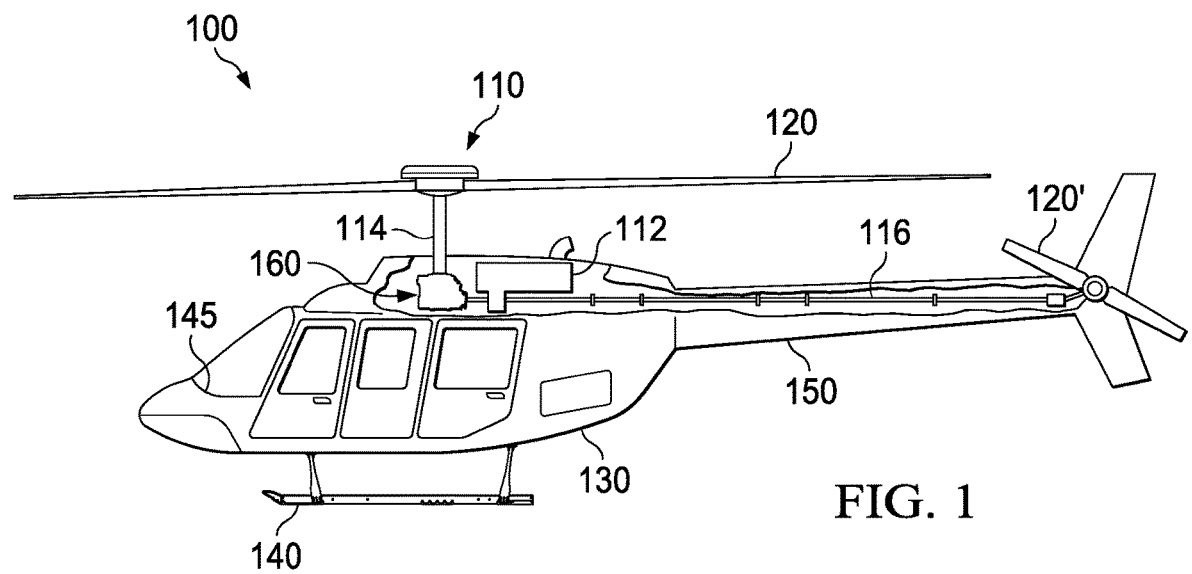
FIG. 1 shows a rotorcraft according to one example embodiment.

In a first aspect, there is a system to monitor lubrication of a drive train, including a lubricant pressure sensor operable to detect a pressure of a lubricant in the drive train and configured to provide a lubricant pressure signal; a lubricant volume sensor operable to detect a volume of the lubricant in the drive train and configured to provide a lubricant volume signal; a non-contact temperature sensor operable to detect a temperature of the drive train and configured to provide a non-contact temperature signal; and a logic management system in communication with the lubricant pressure sensor, the lubricant volume sensor, and the non-contact temperature sensor; the logic management system being configured to receive and process the lubricant pressure signal, the lubricant volume signal, and the non-contact temperature signal. When the lubricant pressure signal reaches a predetermined minimum pressure level and the lubricant volume signal reaches a predetermined minimum volume level, the logic management system supplies non-contact temperature measurement data corresponding to the non-contact temperature signal to a display device.

In an embodiment, the monitoring system includes a lubricant contact temperature sensor operable to detect a temperature of the lubricant in the drive train and configured to provide a lubricant contact temperature signal; and the logic management system in communication with the lubricant contact temperature sensor; the logic management system configured to receive and process the lubricant contact temperature signal. When the logic management system supplies the non-contact temperature signal in the display device, the logic management system will not transmit the lubricant contact temperature signal to the display device.

In another embodiment, the non-contact temperature sensor is at least one of the following: an infrared heat sensor and a laser heat sensor.

In still another embodiment, the drive train comprises a gearbox, the non-contact temperature sensor is disposed in the gearbox.

In yet another embodiment, the non-contact temperature sensor is disposed outside of the gearbox and within a fuselage of a rotorcraft.

In an exemplary embodiment, the non-contact temperature sensor is directed to measure a temperature of at least one of the following: an internal moving component, an internal stationary component, and an external stationary component of the drive train.

In an embodiment, the display device is disposed in a cockpit of a rotorcraft.

In another embodiment, the display device comprises at least one of the following: a graphical user interface, a monitor, and a gauge.

In an illustrative embodiment, the logic management system is disposed in a flight control computer.

In a second aspect, there is a computer-implemented method for monitoring the lubrication of a drive train, the method being performed using one or more processing units in a logic management system, the method including: receiving, by the one or more processing units, a lubricant pressure signal from a lubricant pressure sensor, the lubricant pressure sensor configured to detect a pressure of the lubricant in the drive train; receiving, by the one or more processing units, a lubricant volume signal from a lubricant volume sensor, the lubricant volume sensor configured to detect a volume of the lubricant in the drive train; receiving, by the one or more processing units, a non-contact temperature signal from a non-contact temperature sensor, the non-contact temperature sensor configured to detect a temperature of the drive train; classifying the lubricant pressure signal into a normal pressure level or a predetermined minimum pressure level via the one or more processing units; classifying the lubricant volume signal into a normal volume level or a predetermined minimum volume level via the one or more processing units. When the lubricant pressure signal reaches the predetermined minimum pressure level and the lubricant volume signal reaches the predetermined minimum volume level, generating, by the one or more processing units, non-contact temperature measurement data corresponding to the non-contact temperature signal; and supplying, by the one or more processing units, the non-contact temperature measurement data to a display device.

In an embodiment, the method includes receiving, by the one or more processing units, a lubricant contact temperature signal from a lubricant contact temperature sensor, the lubricant contact temperature sensor configured to detect a temperature of the lubricant in the drive train; wherein when the logic management system supplies a non-contact temperature signal in the display device, the logic management system will not transmit the lubricant contact temperature signal to the display device.

In another embodiment, the one or more processing units are configured to supply lubricant pressure measurement data corresponding to the lubricant pressure signal and lubricant volume measurement data corresponding to the lubricant volume signal to the display device.

In an exemplary embodiment, the display device comprises at least one of the following: a graphical user interface, a monitor, and a gauge.

In still another embodiment, the display device is disposed in a cockpit of a rotorcraft.

In an embodiment, the computer is a flight control computer.

In a third aspect, there is provided a rotorcraft including a fuselage; one or more rotor blades; a drive train coupled to the fuselage and operable to rotate the rotor blades, the drive train comprising: an engine; a gearbox in mechanical communication with the engine; and a lubrication system configured to deliver lubricant to the gearbox; and a monitoring system for the gearbox, the monitoring system comprising: a lubricant pressure sensor operable to detect a pressure of the lubricant in the gearbox and configured to provide a lubricant pressure signal; a lubricant volume sensor operable to detect a volume of the lubricant in the gearbox and configured to provide a lubricant volume signal; a non-contact temperature sensor operable to detect a temperature of the gearbox and configured to provide a non-contact temperature signal; and a logic management system in communication with the lubricant pressure sensor, the lubricant volume sensor, and the non-contact temperature sensor, the logic management system being configured to receive and process the lubricant pressure signal, the lubricant volume signal, and the non-contact temperature signal. When the lubricant pressure signal reaches a predetermined minimum pressure level and the lubricant volume signal reaches a predetermined minimum volume level, the logic management system supplies non-contact temperature measurement data corresponding to the non-contact temperature signal to a display device.

In an embodiment, the non-contact temperature sensor is at least one of the following: an infrared heat sensor and a laser heat sensor.

In another embodiment, the non-contact temperature sensor is disposed in the gearbox.

In an exemplary embodiment, the non-contact temperature sensor is disposed outside of the gearbox and within the fuselage of the rotorcraft.

In an embodiment, the display device is disposed in the fuselage.

In a fourth aspect, there is provided a rotorcraft including a fuselage; one or more rotor blades; a drive train coupled to the fuselage and operable to rotate the rotor blades, the drive train including: an engine; a drive shaft in mechanical communication with the engine; and a lubrication system configured to provide lubricant to the drive shaft; and a monitoring system for the drive shaft, the monitoring system comprising: a non-contact temperature sensor operable to detect a temperature of the lubrication system and configured to provide a non-contact temperature signal; and a logic management system in communication with the non-contact temperature sensor, the logic management system being configured to receive and process the non-contact temperature signal. When the non-contact temperature signal reaches a maximum temperature level, the logic management system supplies non-contact temperature measurement data corresponding to the non-contact temperature signal to a display device.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE PREFERRED EMBODIMENT

Illustrative embodiments of systems for monitoring the lubrication of a drive train and methods therefor are described below. In the interest of clarity, all features of an actual implementation may not be described in this specification. It will, of course, be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, assemblies, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the devices, members, assemblies, etc. described herein may be oriented in any desired direction.

Figure 2:
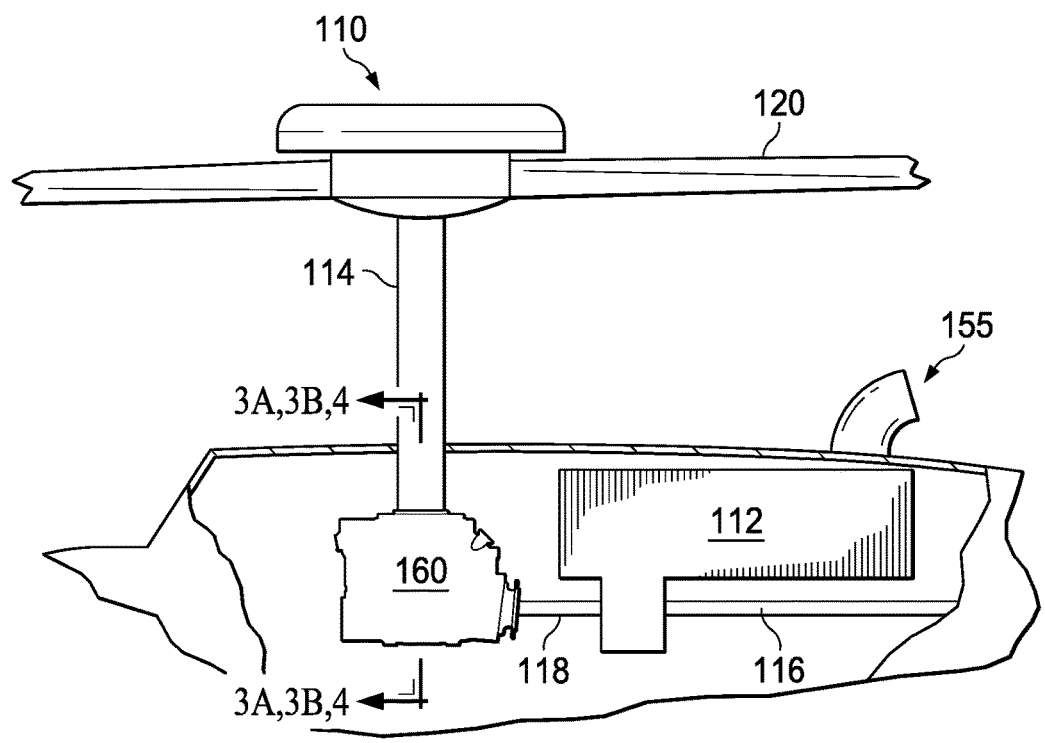
FIG. 2 shows a drive train system of the rotorcraft of FIG. 1.

FIG. 1 shows a rotorcraft 100 according to one example embodiment. Rotorcraft 100 features main rotor system 110, main rotor blades 120, tail rotor blades 120', a fuselage 130, a landing gear 140, and an empennage 150. Main rotor system 110 includes a mast 114 and rotate blades 120. Main rotor system 110 includes a control system for selectively controlling the pitch of each blade 120 in order to selectively control direction, thrust, and lift of rotorcraft 100. FIG. 2 shows an exemplary drive train 155 for the rotorcraft in FIG. 1.

In the example of FIGS. 1 and 2, drive train 155 includes an engine 112, a gearbox 160, a tail rotor drive shaft 116, and an input shaft 118. Engine 112 supplies torque to mast 114, via input shaft 118 operably connected to gearbox 160, for rotating of blades 120. Engine 112 also supplies torque to tail rotor drive shaft 116 for rotating blades 120'. In the examples of FIGS. 1 and 2, gearbox 160 is a main rotor transmission system (e.g., a main rotor gearbox). Teachings of certain embodiments recognize, however, that drive train 155 may include more or different gearboxes than gearbox 160 shown in FIG. 1.

Fuselage 130 represents the body of rotorcraft 100 and may be coupled to main rotor system 110 such that main rotor system 110 and blades 120 may move fuselage 130 through the air. Fuselage 130 includes a cockpit 145 with flight controls for the pilot. Landing gear 140 supports rotorcraft 100 when rotorcraft 100 is landing and/or when rotorcraft 100 is at rest on the ground. Empennage 150 represents the tail section of the aircraft and features tail rotor blades 120'. Tail rotor blades 120' may collectively provide thrust in the same direction as the rotation of blades 120 so as to counter the torque effect created by blades 120.

Figure 3A:
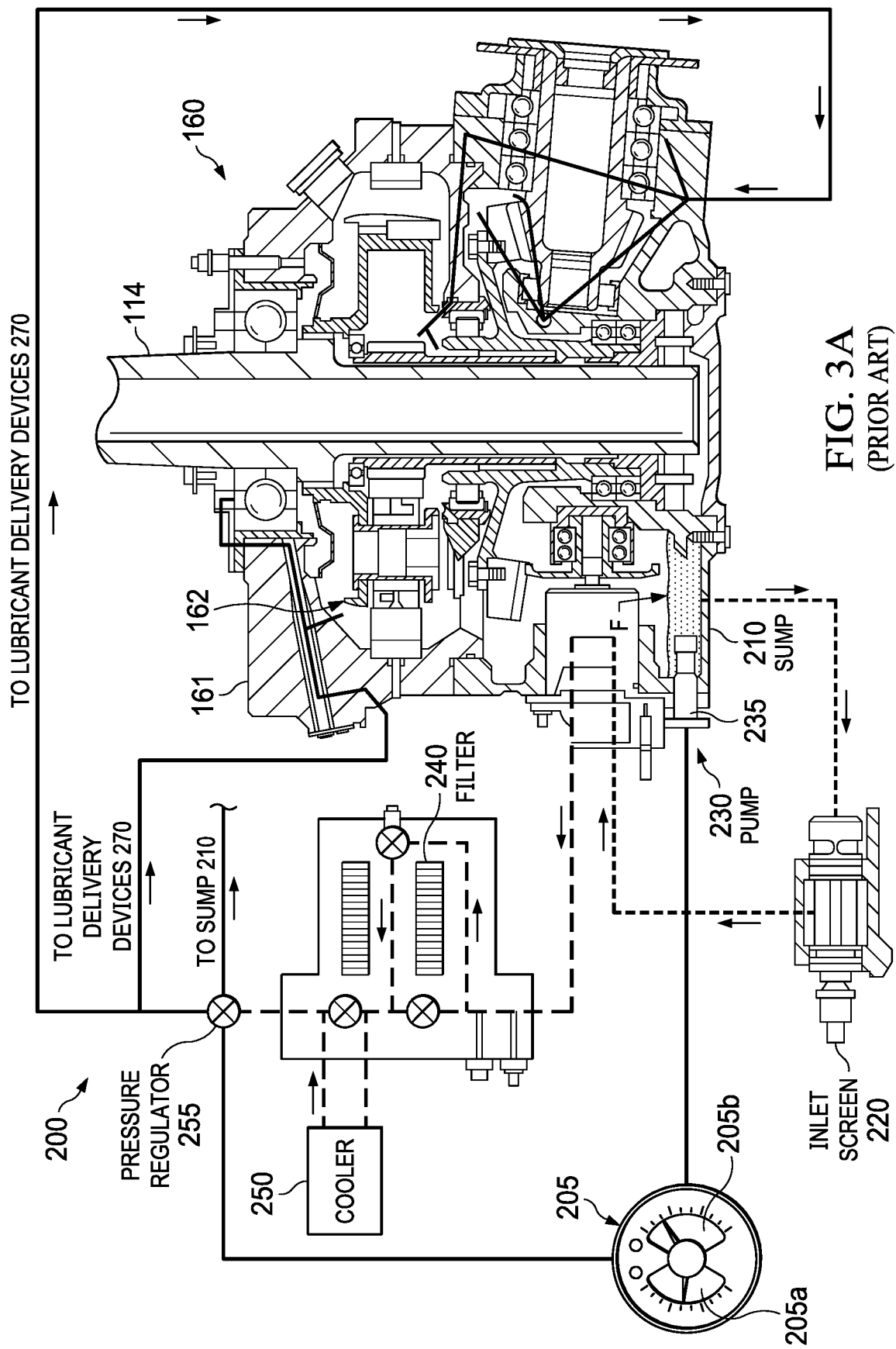
FIG. 3A shows a prior art lubrication system for a rotorcraft gearbox operating with lubricant.
Figure 3B:
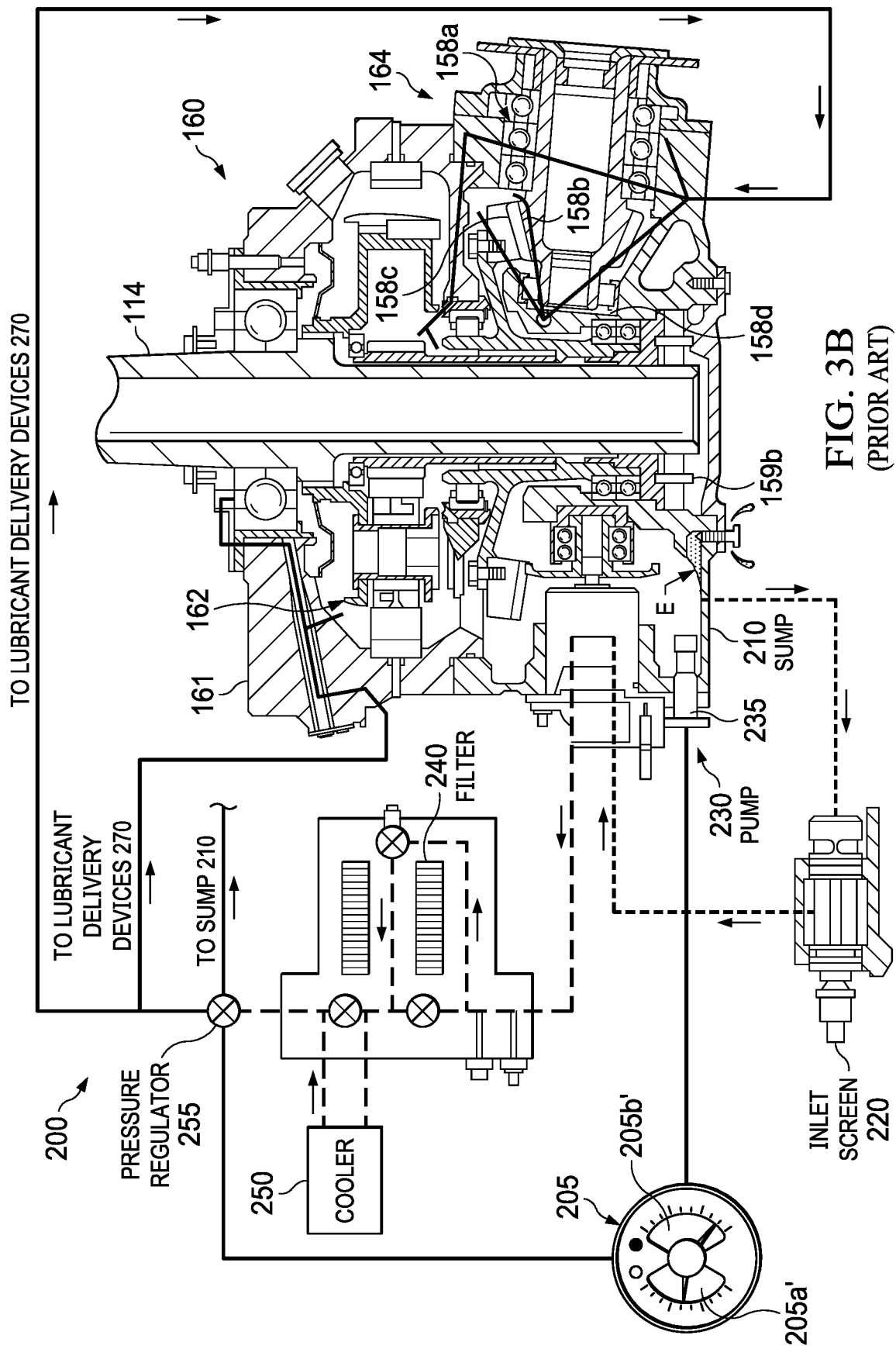
FIG. 3B shows a prior art lubrication system with lubricant leaking externally from the gearbox.
Figure 4:
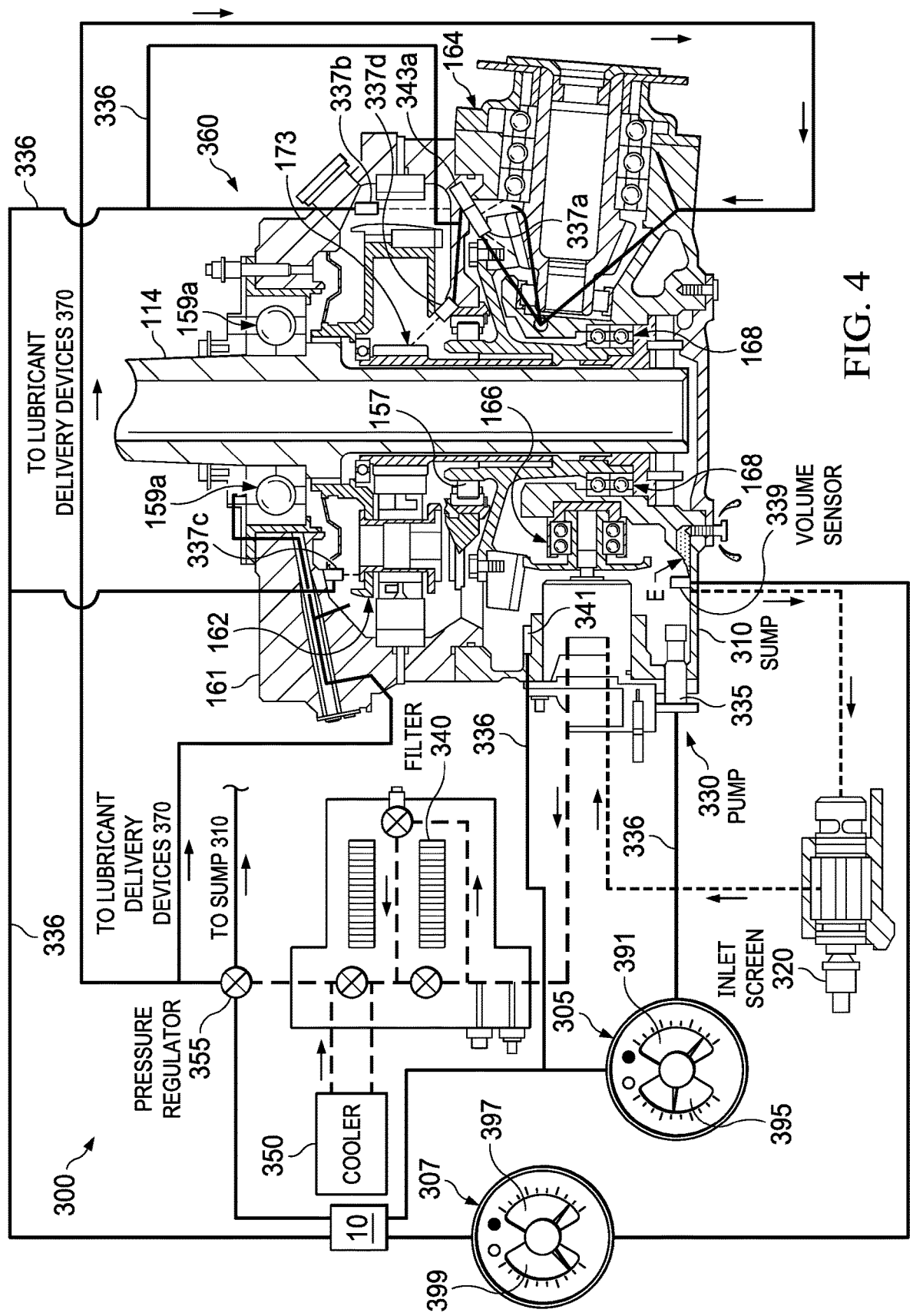
FIG. 4 shows a system for monitoring the lubrication of a rotorcraft gearbox including non-contact temperature sensors mounted internally.

Gearbox 160 may include various gears and bearings. A gear is a rotating part having teeth that mesh with another toothed part in order to transmit torque. Gears in a gearbox may be used to provide speed and torque conversions. A bearing may include any of various machine elements that constrain the relative motion between two or more parts to only the desired motion. Bearings in gearbox 160 may perform tasks such as supporting a gear shaft. An exemplary configuration for gearbox 160 is shown in FIGS. 3A-3B and 4. In an exemplary embodiment, shown in FIGS. 3A-3B and 4, the gearbox 160 includes at least some of the following components: gear shaft roller bearing 157, mast ball bearing 159a, mast roller bearing 159b, a housing 161, a planetary bearing assembly 162, a main input gear mesh and associated triplex bearing 164, duplex bearing associated with an internal oil pump drive pinion 166, gear shaft duplex bearing 168, and a planetary sun gear 173. In the exemplary embodiment, the main input gear mesh and associated triplex bearing 164 can include a triplex bearing 158a, a spiral bevel pinion 158b, a spiral bevel gear 158c, and pinion roller bearing 158d. The spiral bevel pinion 158b and spiral bevel gear 158c form an input mesh area that produces lubricant fling off during operation.

Figure 6B:
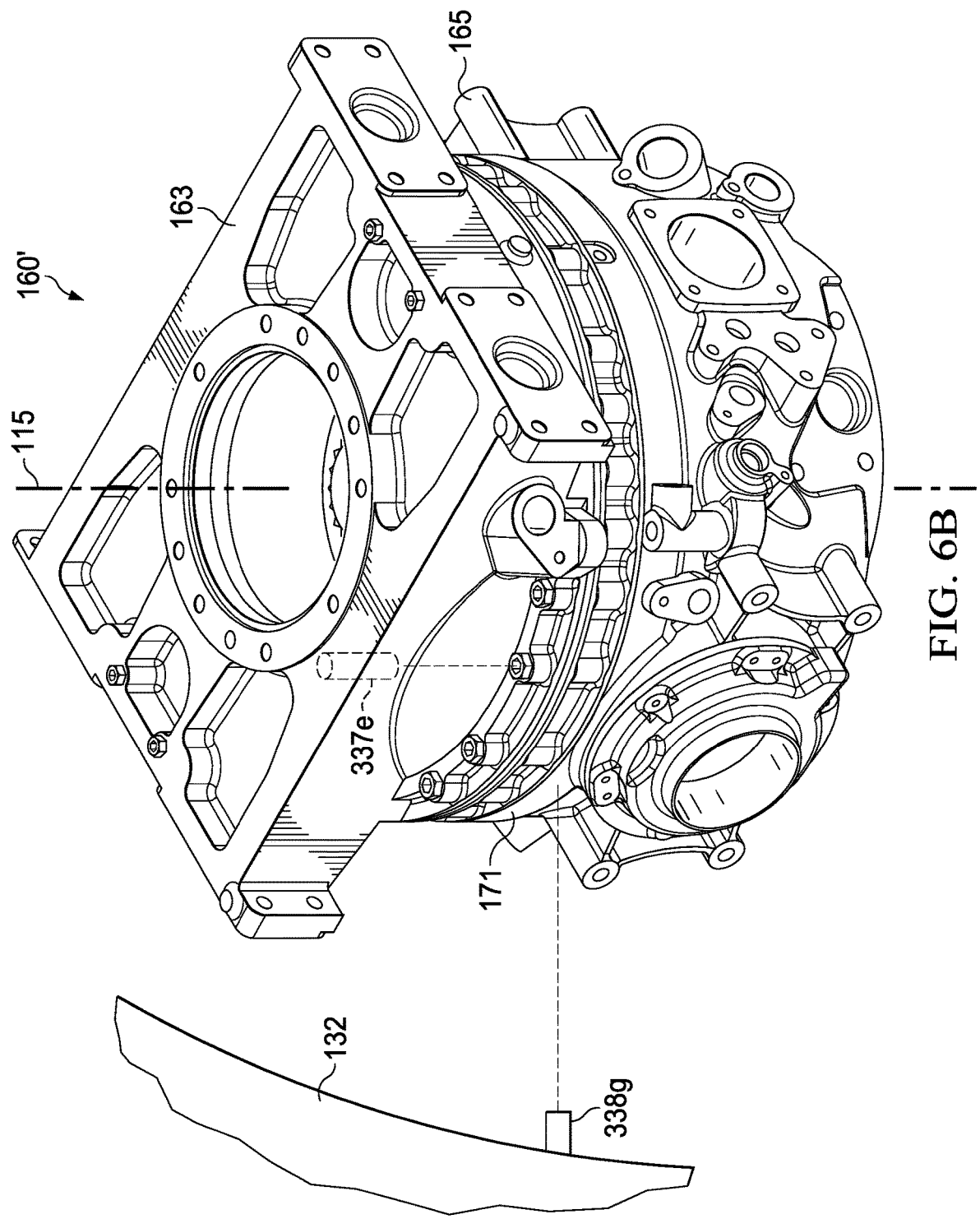
FIG. 6B is a schematic illustration of non-contact temperature sensors for monitoring the lubrication of a gearbox (shown in a perspective view), according to one example embodiment.
Figure 6C:
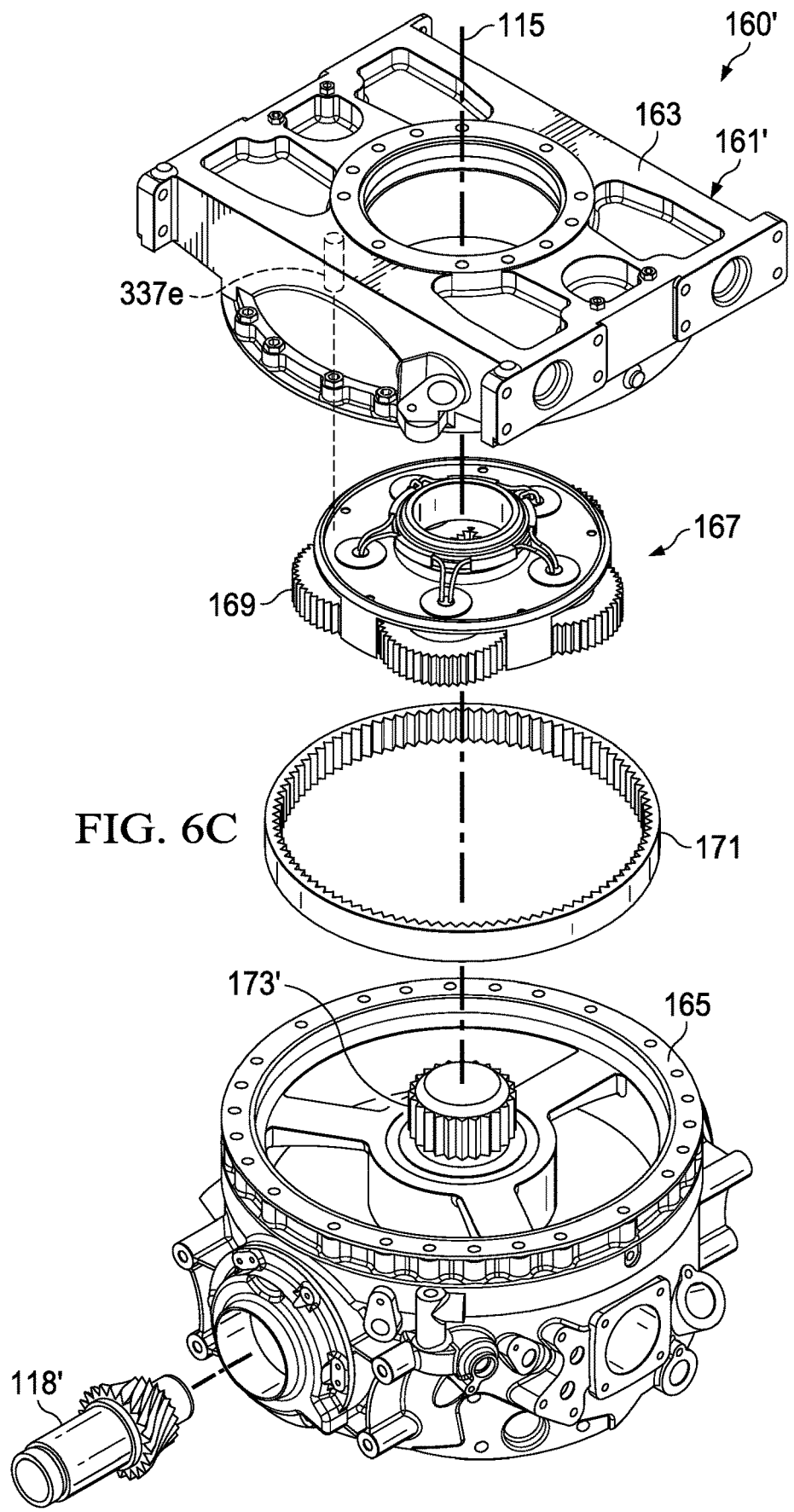
FIG. 6C is a partially exploded view of the gearbox in FIG. 6B.

Another exemplary configuration for gearbox 160' is shown in FIGS. 6B-6C with like features identified by like numerals with a primed suffix (') and new features identified by new numerals. Gearbox 160' can include an upper housing 163 and a lower housing 165 that couple together to form a single unitary housing 161' configured to encompass internal components. Internal components may include a planetary carrier assembly 167 having planetary pinions 169, a planetary ring gear 171, a planetary sun gear 173', and an input shaft 118'. It is understood that different embodiments of gearbox 160' may utilize either a plurality of planetary carrier assemblies 167, or may refrain from using any planetary carrier assemblies 167, depending on the configuration. Lower housing 165, planetary ring gear 171, planetary carrier assembly 167, and upper housing 163 are each configured to rotate along a rotational axis 115. Input shaft 118' is a portion of a drive linkage interconnecting engine 112 and gearbox 160'.

Although described with specific internal components, it is understood that the exemplary gearboxes 160, 160' may function with and utilize any number of selected components other than those depicted and described. It will be appreciated that the exemplary gearboxes 160, 160' can take a on a wide variety of configurations.

Gears, bearings, and other mechanical components of drive train 155 are subject to wear and heat generation due to contact with other components. The mechanical components in the drive train 155 may be lubricated to reduce friction and transfer heat away from the components. Lubrication is the process or technique employed to reduce wear of one or both surfaces in close proximity, and moving relative to each other, by interposing a substance, such as lubricant, between the surfaces to help carry the load (pressure generated) between the opposing surfaces.

A lubricant is a substance introduced to reduce friction between moving surfaces. Examples of lubricants include oil, biolubricants derived from plants and animals, synthetic oils, semi-solid lubricants (grease), solid lubricants, and aqueous lubricants. Example transmission oils for gearbox 160 may include oils meeting specifications MIL-PRF-23699 (5 cSt), DOD-L-7808 (3-4 cSt), DOD-PRF-85734 (5 cSt), and other oils in the 9 cSt to 10 cSt viscosity range.

Drive train 155 may include one or more lubrication systems to provide lubricant to the mechanical components, such as gearbox 160. FIGS. 3A-3B show a conventional lubrication system 200 for a gearbox 160. Conventional lubrication system 200 features a temp and pressure indicator 205 ("TP indicator"), a lubricant sump 210, a lubricant inlet screen 220, a pump 230, a filter 240, a lubricant cooler 250, a pressure regulator 255, and lubricant delivery devices 270. Embodiments of lubrication system 200 may be pressurized or unpressurized. For example, lubricant delivery devices 270 may dispense either pressurized or unpressurized lubricant on a part. In an exemplary embodiment, the lubricant delivery devices 270 can be comprised of at least one of the following: a jet configured to deliver a pressurized flow of lubricant and a lubricant orifice configured to provide an unpressurized gravity drip of lubricant.

Lubricant sump 210 is a reservoir that stores lubricant within lubrication system 200, shown in FIGS. 3A-3B. Sump 210 may be integral with the housing 161 of gearbox 160 (as shown in FIG. 3A-3B) or separate from the housing 161 of gearbox 160 and include a lubricant contact temperature sensor 235 configured to detect the temperature of lubricant in the sump 210. Lubricant inlet screen 220 is a filter that removes the largest particulates from the lubricant. Pump 230 circulates lubricant under pressure throughout lubrication system 200. Filter 240 removes some contaminants from the lubricant. Lubricant cooler 250 may lower the temperature of the lubricant before the lubricant is applied to the various components that generate heat. Pressure regulator 255 measures the lubricant pressure within lubrication system 200 and diverts excess lubricant back to lubricant sump 210 if the lubricant pressure is too high. Lubricant delivery devices 270 may dispense lubricant on components of gearbox 160 that are subject to friction and/or generate heat, such as gears and bearings.

Under healthy operating conditions when the conventional lubrication system 200 is working properly, lubricant fills the sump 210 to a functional level F and the lubricant contact temperature sensor 235 and pressure regulator 255 indicate the correct temperature and pressure 205*a*, 205*b* at the TP indicator 205, as shown in FIG. 3A. When an external leakage of lubricant occurs as shown in FIG. 3B, which results in loss of lubricant volume, lubricant in the sump 210 is reduced to a nonfunctional level E. The lubricant contact temperature sensor 235 falsely indicates the temperature 205*a*' as normal based upon the ambient atmosphere since no lubricant is in contact with the lubricant contact temperature sensor 235. As shown in FIG. 3B, a loss of lubrication event due to leakage can render the lubricant contact temperature sensor 235 to send a false low or normal temperature signal 205*a*' to the TP indicator 205, while the pressure regulator 255 sends a low oil pressure signal 205*b*' to a TP indicator 205. The conflicting low lubricant temperature and low lubricant pressure signals 205*a*', 205*b*' often lead the flight crew to misdiagnose the gearbox 160 as being sufficiently lubricated. This misdiagnosis can lead to catastrophic gearbox failure and result in loss of life.

A system for monitoring the lubrication of a drive train and methods related thereto are described herein prevent the misdiagnosis associated with conventional methods for monitoring the lubrication of a drive train. An illustrative embodiment of a system for monitoring the lubrication of a drive train 300 involving the gearbox 160 is shown in FIGS. 4, 5A-5B, 6A-6C, and 7-10. Certain components of the system for monitoring the lubrication of the drive train 300 as illustrated by gearbox 160 are as described above in connection with the lubrication system 200. Those components bear similar reference characters to the components of the system 200, but with a leading '3' rather than a leading '2'. The system 300 includes a lubricant contact temperature sensor 335, a non-contact temperature sensor 337, 338; a lubricant volume sensor 339; a lubricant pressure sensor 341; and a logic management system 20. In some embodiments, the system 300 further includes a surface contact temperature sensor 343 (e.g., a first surface contact temperature sensor 343*a*, a second surface contact temperature sensor 343*b*).

Figure 7:
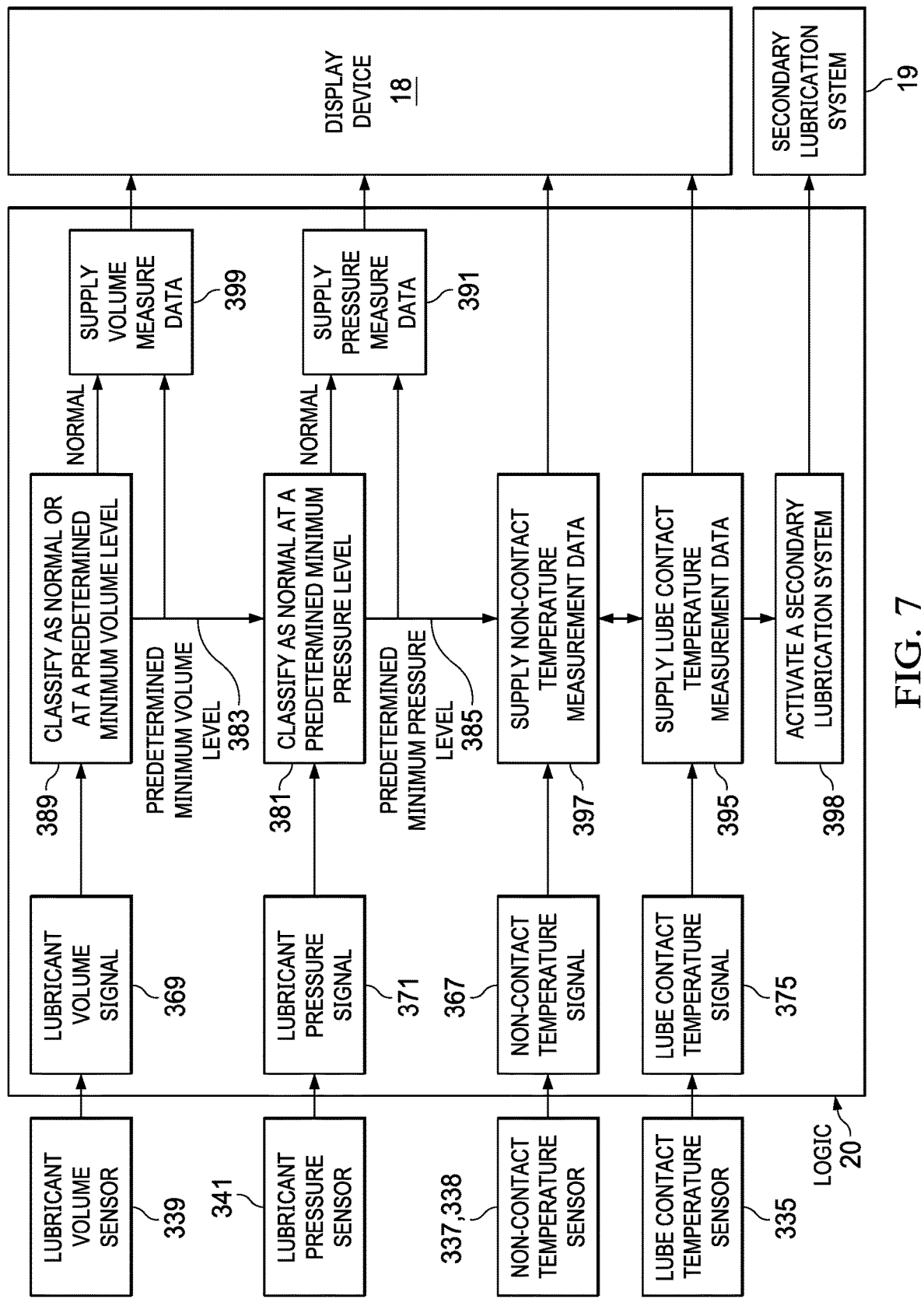
FIG. 7 is a schematic illustration of a method for monitoring the lubrication of a drive train.

The non-contact temperature sensor 337, 338 is operable to detect a temperature of the gearbox 160 and configured to provide a non-contact temperature signal 367, as shown in FIG. 7. The non-contact temperature sensor 337, 338 is comprised of at least one of the following: an infrared heat sensor and a laser heat sensor. The non-contact temperature sensor 337, 338 can be mounted in a variety of configurations and can be oriented to provide an actual surface temperature of a component in, on, or associated with the gearbox 160. In an embodiment, the non-contact temperature sensor 337, 338 is directed to measure a surface temperature of at least one of the following: lubricant on a surface, an internal moving component, an internal stationary component, and an external stationary component. The internal stationary component can include a housing of a moving component (e.g., a housing having bearings or gears therein). The external stationary component can include a housing of a drive train 155 component such as housing 161 of gearbox 160.

Figure 5A:
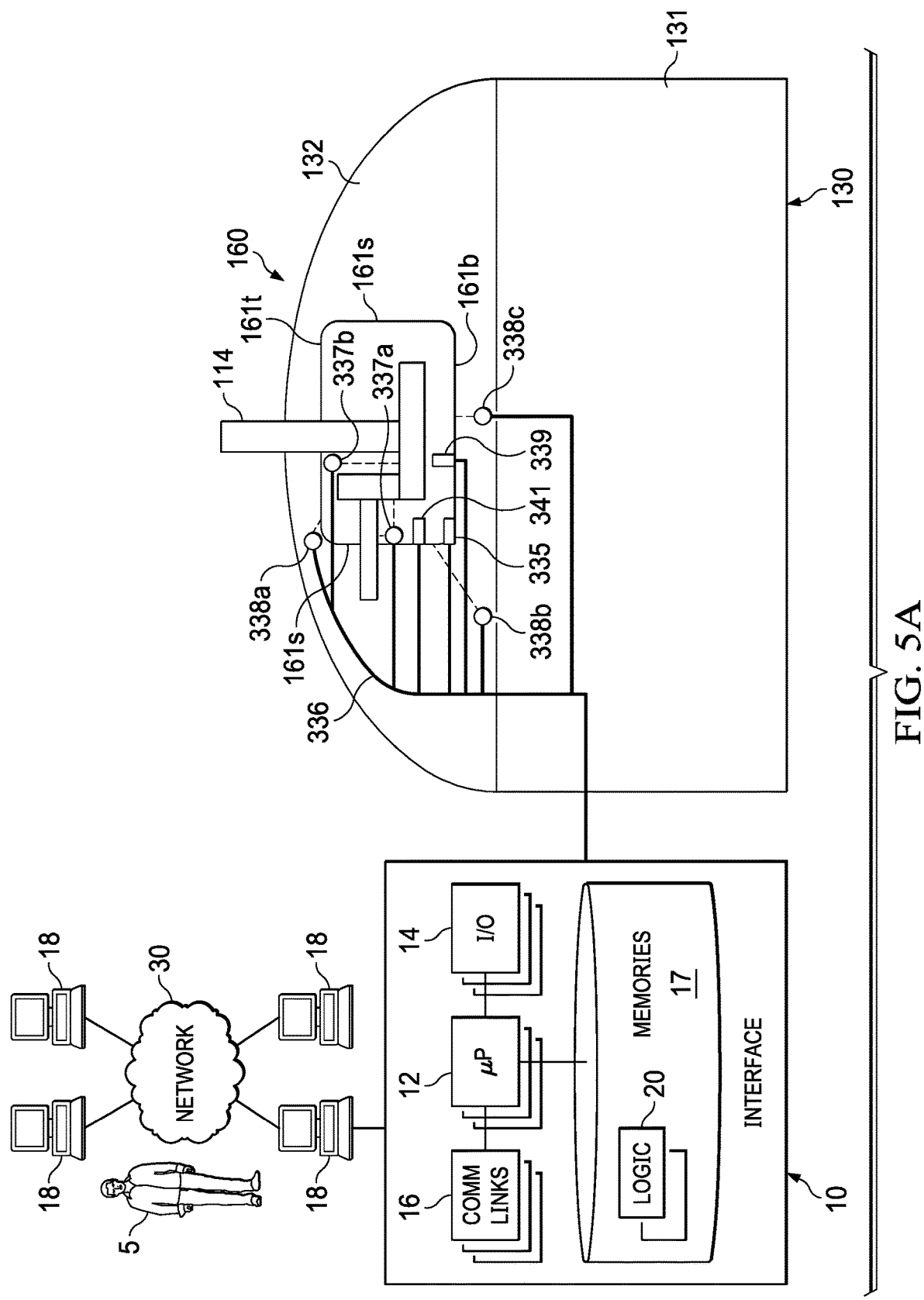
FIG. 5A is a schematic illustration of a system for monitoring lubrication of a rotorcraft gearbox including non-contact temperature sensors mounted internally and externally of the gearbox.

In an illustrative embodiment, there are one or more non-contact temperature sensors 337, 338 (e.g., first, second, third, fourth non-contact temperatures sensors 337*a*, 337*b*, 337*c*, 337*d*; and/or first, second, third, fourth, fifth, and sixth non-contact temperatures sensors 338*a*, 338*b*, 338*c*, 338*d*, 338*e*, 338*f*). The actual number of non-contact temperature sensors 337, 338 varies depending on the configuration of the gearbox 160 and the fuselage 130. FIGS. 4 and 5A-5B illustrate exemplary embodiments and include dashed lines that schematically represent the directions at which the non-contact temperature sensors 337, 338 are measuring and do not indicate a physical portion of the non-contact temperature sensor.

In an embodiment, shown in FIG. 4, one or more non-contact temperature sensors 337 are disposed in the gearbox 160. In an embodiment, as illustrated in FIGS. 4-5A, one or more non-contact temperature sensors 337 are disposed within a gearbox housing 161. In an embodiment, shown in FIG. 4, the first and second non-contact temperature sensors 337*a*, 337*b* are oriented to measure the actual surface temperature of the main input gear mesh and associated triplex bearing 164 and/or lubricant fling off associated therewith. In an illustrative embodiment, first non-contact temperature sensor 337*a* is oriented to measure the surface temperature of at least one of the following: the lubricant fling off associated with the input mesh area (e.g., the spiral bevel pinion 158*b*, the spiral bevel gear 158*c*), the input mesh area, and the triplex bearing 158*a*. In an illustrative embodiment, the first non-contact temperature sensor 337*a* is oriented to measure the actual surface temperature of at least one of the following: the lubricant fling off associated with main input gear mesh and triplex bearing 164 and an internal stationary housing or support therefor (for example, but not limitation, the housing for the triplex bearing 158*a*). In an illustrative embodiment, the second non-contact temperature sensor 337*b* is oriented to measure an actual surface temperature of a stationary housing supporting the main input gear mesh and triplex bearing 164. In an illustrative embodiment, the third non-contact temperature sensor 337*c* is oriented to measure the actual surface temperatures of the planetary bearing assembly 162. In another illustrative embodiment, as shown in FIG. 4, the fourth non-contact temperature sensor 337*d* is oriented to measure an actual surface temperature of the sun gear 173 and/or any associated lubricant fling off.

In a particular embodiment, a non-contact temperature sensor 337 within the gearbox 160 is oriented to measure the surface temperature of a high-speed component disposed therein (e.g., the main input gear mesh and triplex bearing 164) and/or the housing or support for the high-speed component. If an external loss of lubricant event occurs for high-speed components in the gearbox 160, there may be a limited amount of time for landing the aircraft safely. The system 300 can advantageously provide accurate temperatures to the pilot so the pilot can correctly determine the length of time to safely land the aircraft 100 prior to failure of the insufficiently lubricated high-speed components. Generally low-speed components in and associated with the drive train 155 would not be monitored by a non-contact temperature sensor 337 (e.g., the non-contact temperature sensor 337 would not be oriented to measure components associated with the mast 114 since the mast 114 and components associated therewith are low-speed components; for example, but not limitation, the mast ball bearing 159*a*, mast roller bearing 159*b*, and duplex bearing 168 operate at low speeds). Lubricant of low-speed components in and associated with the drive train 155 would not be monitored because a loss of lubricant event may not be critical to the safe operation of the aircraft 100.

In another embodiment, shown in FIG. 5A, one or more non-contact temperature sensors 338 are disposed outside of or external to the gearbox 160 and within the fuselage 130 of the rotorcraft. In an embodiment, the fuselage 130 includes a cargo or passenger area 131 and a mechanical area 132 for housing mechanical components such as the gearbox, engine, etc. The mechanical area 132 is shown in the top portion of the fuselage 130; however, in other embodiments, the mechanical area 132 is located forward, aft, or below the cargo or passenger area 131. In an embodiment, shown in FIG. 6, the one or more non-contact temperature sensors 338 are disposed in mechanical area 132 of the fuselage 130. In an embodiment, a first non-contact temperature sensor 338a is disposed at the top of the fuselage 130 in the mechanical area 132 and directed to measure the actual surface temperature of the gearbox housing 161 (e.g., the top and sides of the gearbox housing 161t, 161s). In an exemplary embodiment, second and third non-contact temperature sensors 338b, 338c are disposed in the mechanical area 132 and on a surface adjacent to the cargo or passenger area 131 and directed to measure the actual surface temperatures of gearbox housing 161 (e.g., the sides and bottom of the gearbox housing 161s, 161b). In an illustrative embodiment, the second non-contact temperature sensor 338b is oriented to measure the surface temperature of a side of the housing 161s which is for example, but not limited to, adjacent to at least one of the following: the main input gear mesh and associated triplex bearing 164 disposed within the gearbox 160. In other embodiments, the surface temperatures of heat pipes or other heat transfer devices adjacent to or within the gearbox 160 can be monitored by a non-contact temperature sensor 338.

In some embodiments shown in FIG. 5B, one or more non-contact temperature sensors 337 are disposed in the gearbox 160 (e.g., internal non-contact temperature sensors 337) and one or more non-contact temperature sensors 338 are disposed outside of or external to the gearbox 160 (e.g., external non-contact temperature sensors 338). In another illustrative embodiment of gearbox 160' as shown in FIGS. 6B-6C, a fifth non-contact temperature sensor 337e is disposed internally in gearbox 160' and a seventh non-contact temperature sensor 338g is disposed externally to the gearbox 160'. The fifth non-contact temperature sensor 337e is oriented to measure the surface temperature of planetary pinions 169 in the planetary carrier assembly 167'. A seventh non-contact temperature sensor 338g is oriented to measure the surface temperature of a planetary ring gear 171.

The lubricant volume sensor 339 is operable to detect a volume of the lubricant in the gearbox 160 and configured to provide a lubricant volume signal 369. In an exemplary embodiment, the lubricant volume sensor 339 is disposed in the lubricant sump 310 of the gearbox 160 as shown in FIG. 4. In an embodiment, the lubricant volume sensor 339 is disposed at the bottom of the gearbox 160 housing. In other embodiments, the lubricant volume sensor 339 is disposed in a lubricant tank or reservoir.

The lubricant pressure sensor 341 is operable to detect a pressure of the lubricant in the gearbox 160 and configured to provide a lubricant pressure signal 371. Examples of pressure sensors may include strain-gauge sensors, capacitive sensors, electromagnetic sensors, piezoelectric sensors, optical sensors, potentiometric sensors, resonant sensors, and thermal sensors, to name a few.

In some embodiments, a lubricant contact temperature sensor 335 is configured to detect the temperature of lubricant and air in contact therewith. The lubricant contact temperature sensor 335 is configured to provide a lubricant contact temperature signal 375.

In still some embodiments, as shown in FIG. 4, a surface contact temperature sensor 343 is configured to detect the temperature of a component surface in contact therewith. There can be one or more surface contact temperature sensors 343 (e.g., a first surface contact temperature sensor 343a, a second surface contact temperature sensor 343b) disposed in the gearbox 160. In an embodiment, the surface contact temperature sensor 343 is a thermocouple. In an illustrative embodiment, shown in FIG. 4, a first surface contact temperature sensor 343a is in contact with a surface of the main input gear mesh and triplex bearing 164. The surface contact temperature sensor 343 is configured to provide a surface contact temperature signal 377. In some embodiments, the surface contact temperature sensor 343 is disposed adjacent to a non-contact temperature sensor 337 and serves as a redundant sensor in the event a non-contact temperature sensor 337 is damaged, destroyed, or fails to operate as designed.

The logic management system 20 is in communication with the non-contact temperature sensor 337, lubricant contact temperature sensor 335, surface contact temperature sensor 343, the lubricant volume sensor 339, and lubricant pressure sensor 341, as shown in FIGS. 4, 5A-5B, and 7, via wires 336 (shown in FIGS. 4 and 5A-5B) or wirelessly across a network 30. The logic management system 20 is configured to receive and process the non-contact temperature signal 367, the lubricant volume signal 369, lubricant pressure signal 371, and the lubricant contact temperature signal 375.

In some embodiments, as shown in FIG. 7, the logic management system 20 performs the step 389 of classifying the lubricant volume signal 369 into a normal volume level or a predetermined minimum volume level 383 via one or more processing units. In an exemplary embodiment, the lubricant volume signal 369 is classified as a normal volume level when lubricant is in suspension as it is pumped through the lubricant system 200 in the gearbox 160. In another exemplary embodiment, the lubricant volume signal 369 is classified as a normal volume level when lubricant is pooled in gearbox 160 and above a nonfunctional level E. The lubricant volume signal 369 is classified as predetermined minimum volume level 383 when lubricant volume has been lost external to gearbox 160 (e.g., lubricant is at a nonfunctional level E), as shown in FIG. 4. In an illustrative embodiment, the nonfunctional level E is defined as a lubricant volume of 25 percent or less in the sump 210 while oil is in suspension, or a level where the contact sensor 335 is not continuously in contact with the lubricant (e.g., contact sensor 335 is continuously bathed in oil). The logic management system 20 performs the step of supplying lubricant volume measurement data 399 to a display device 18. The lubricant volume measurement data corresponds to the classified lubricant volume signal 369.

As shown in FIG. 7, the logic management system 20 performs the step 381 of classifying the lubricant pressure signal 371 into a normal pressure level or a predetermined minimum pressure level 385 one or more processing units. In an exemplary embodiment, the lubricant pressure signal 371 is classified as normal when greater than 3 psi during operation of the rotorcraft 100. In another illustrative embodiment, the lubricant pressure signal 371 is classified as normal when greater than or equal to 1 psi. In an illustrative embodiment, the lubricant pressure signal 371 is classified as predetermined minimum volume level 383 when the lubricant pressure signal 371 is less than 1 psi. The logic management system 20 performs the step of supplying lubricant pressure measurement data 391 to the display device 18. The lubricant pressure measurement data corresponds to the classified lubricant pressure signal 371.

As shown in FIG. 7, when the lubricant volume signal 369 is classified in step 389 as the predetermined minimum volume level 383 and the lubricant pressure signal 371 is classified in step 381 as a predetermined minimum pressure level 385, the logic management system 20 supplies non-contact temperature measurement data 397 to the display device 18. The non-contact temperature measurement data 397 corresponds to the non-contact temperature signal 367. In some embodiments, there is a plurality of non-contact temperature signals 367 that correspond to the non-contact measurement data 397. Advantageously, the non-contact temperature measurement data 397 is shown in the display device 18, which provides the actual surface temperature(s) of the gearbox 160 and/or one or more components therein to the flight crew.

The display device 18 can include at least one of the following: a graphical user interface, a monitor, and a gauge. In some embodiments, the display device 18 is a digitized glass display. In an embodiment, the display device 18 is located within the cockpit 145 of the fuselage 130 and operable to display information to the flight crew. Although described as being integrated within existing systems on rotorcraft 100, it is understood that other embodiments permit logic management system 20 and/or display device 18 to be a separate unit located on or off rotorcraft 100. For example, logic management system 20 and/or display device 18 may be located remote to rotorcraft 100, such as on one or more computers located on another aircraft, ground vehicle, structure, or ship. By being independent and separate from existing systems on rotorcraft 100, system 300 is adapted to be retrofitted to existing aircraft.

In an illustrative embodiment, shown in FIG. 4, the display device 18 includes a gauge 307 that shows the non-contact temperature measurement data 397 and the lubricant volume measurement data 399. The non-contact temperature measurement data 397 provides the actual operating temperature of the gearbox 160 and/or one or more components therein. The actual operating temperature, as shown in FIG. 4, indicates that the gearbox 160 and/or more components therein are overheating and that the lubricant is at a nonfunctional level E to the flight crew so immediate corrective action may be taken before catastrophic gearbox failure. In some embodiments, the lubricant volume measurement data 399 confirms to the flight crew that lubricant volume is at a nonfunctional level E to the flight crew. In some embodiments, the display device 18 shows a plurality of actual surface temperatures of the gearbox 160 and/or one or more components therein based on the non-contact temperature data 397.

In some embodiments, as shown in FIGS. 4 and 7, the display device 18 includes a gauge 305 that shows the lubricant pressure measurement data 391 and the contact temperature measurement data 395, as shown in FIG. 4. When lubricant volume is at a nonfunctional level E, the contact temperature measurement data 395 shows the temperature of the ambient air (and not the lubricate), which incorrectly indicates that the temperature of the gearbox 160 as normal. The lubricant pressure measurement data 391 indicates insufficient lubricant pressure when lubricant volume is at or reaching a nonfunctional level E.

In some other embodiments, as shown in FIG. 7, when the logic management system 20 can, in response to at least the non-contact temperature measurement data 397, automatically activate a secondary lubrication system 19 in step 398. In an embodiment, the secondary lubrication system 19 is a bypass valve (e.g., to bypass a leak in the lubrication system 200) and/or a backup lubrication system.

Figure 8:
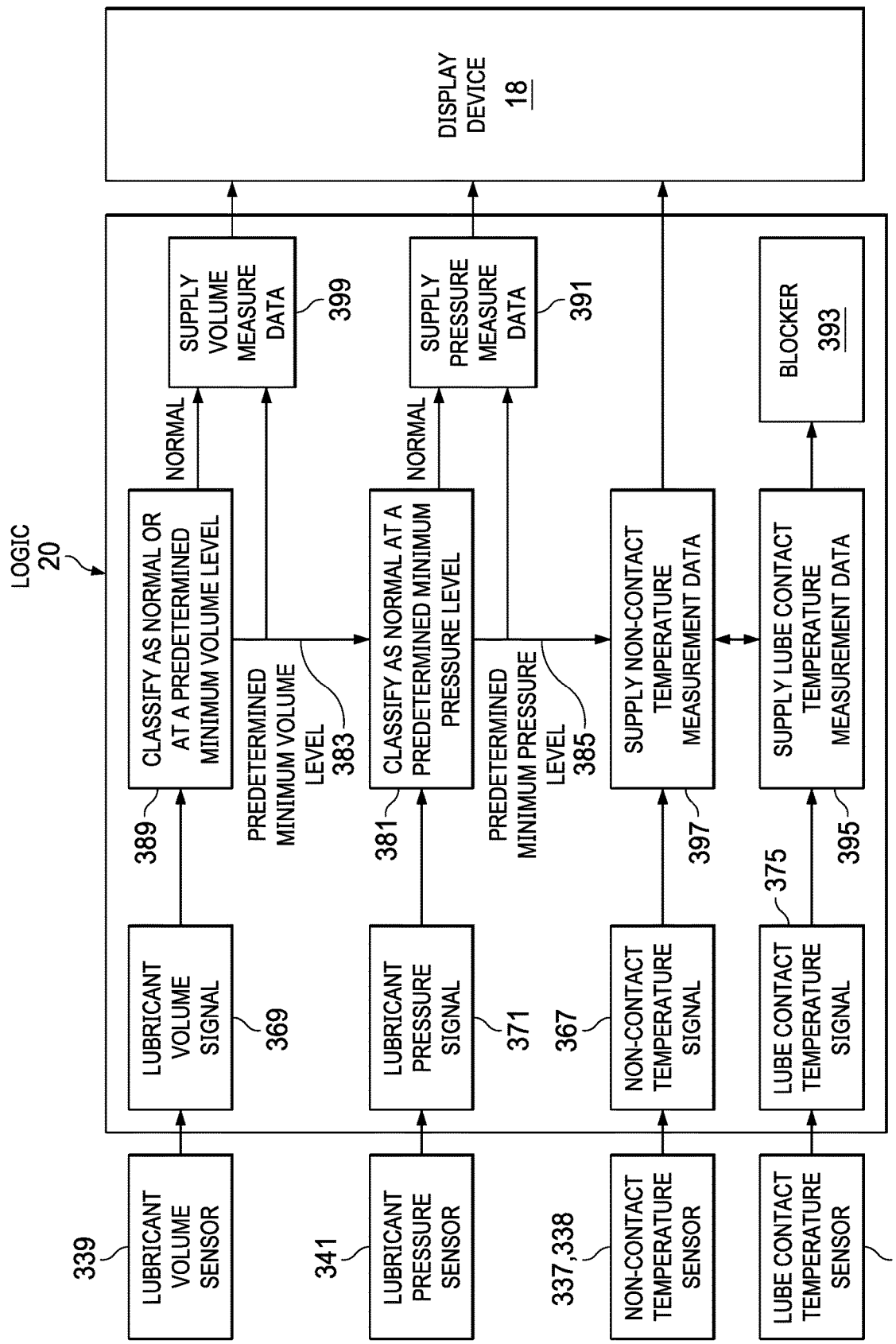
FIG. 8 is a schematic illustration of an embodiment of a method for monitoring the lubrication of a drive train.

In some embodiments, as shown in FIG. 8, when the logic management system 20 displays a non-contact temperature measurement data 397 in the display device 18, the logic management system 20 will not transmit and/or blocks 393 the lubricant contact temperature signal 375 and/or the contact temperature measurement data 395 to the display device 18. Accordingly, only the non-contact temperature measurement data 397 is supplied to the display device 18 so as not to provide the flight crew with conflicting temperature readings of the gearbox 160 and/or one or more components therein. In some embodiments, the display device 18 provides only one gearbox temperature gauge but includes an indicator light as to whether it is being supplied with non-contact temperature data 397 or contact temperature measurement data 395.

Figure 9:
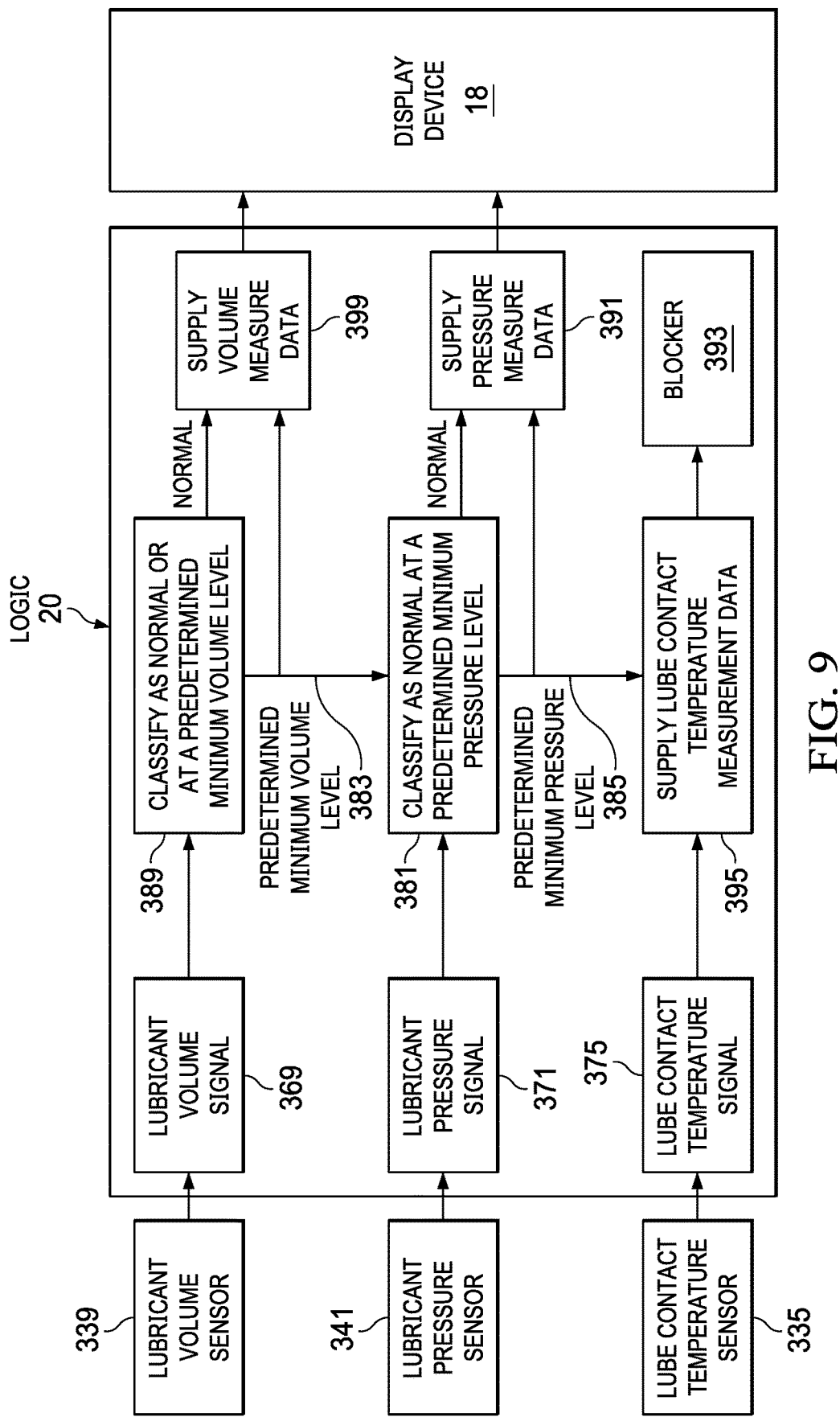
FIG. 9 is a schematic illustration of an embodiment of a method for monitoring the lubrication of a drive train.

In some embodiments, as shown in FIG. 9, when the lubricant volume signal 369 is classified in step 389 as a predetermined minimum volume level 383 when lubricant volume has been lost external to gearbox 160 (e.g., lubricant is at a nonfunctional level E) and when the lubricant pressure signal 371 is classified in step 381 as reaching a predetermined minimum pressure level 385, the logic management system 20 will not transmit and/or blocks 393 the lubricant contact temperature signal 375 to the display device 18. A blank temperature reading or block of the temperature reading (e.g., a solid or X over the reading) in the display device 18 will signal to the flight crew that the lubricant is at a nonfunctional level E so immediate corrective action may be taken before catastrophic gearbox failure.

Figure 10:
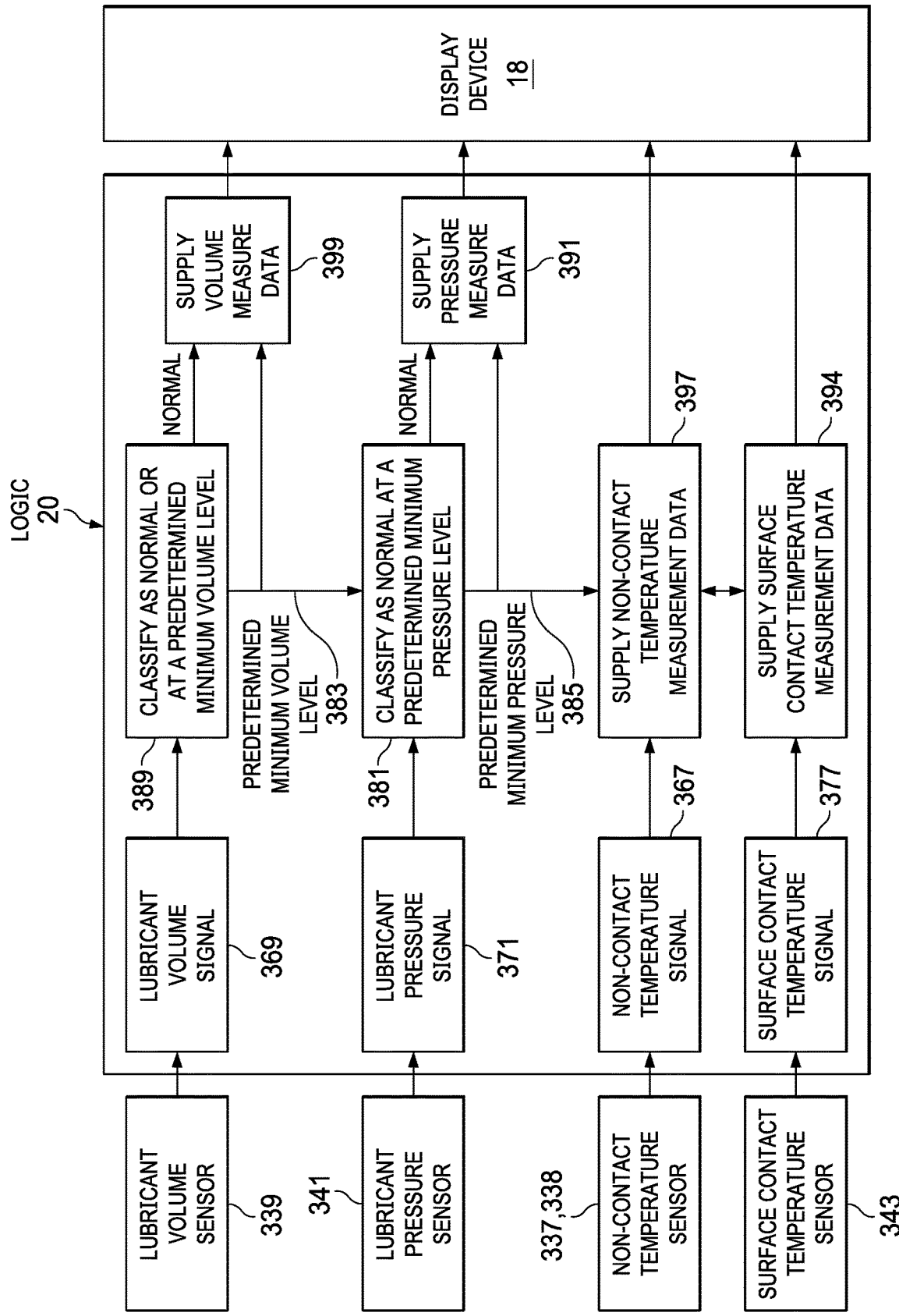
FIG. 10 is a schematic illustration of another embodiment of a method for monitoring the lubrication of a drive train.

In still other embodiments, as shown in FIG. 10, when the system 300 includes a surface contact temperature sensor 343, the logic management system 20 is configured to receive and process the non-contact temperature signal 367, the lubricant volume signal 369, lubricant pressure signal 371, and the surface contact temperature signal 377. The logic management system 20 performs the steps 389, 399, 381, 391, and 397 as described with regard to FIG. 7 and can also perform the step 394 of supplying the surface contact temperature measurement data to the display device 18. The surface contact temperature measurement data shown in the display device 18 can serve as a redundant temperature measurement data in the event a non-contact temperature sensor 337 is damaged, destroyed, or fails to operate as designed. In some embodiments, both the non-contact temperature measurement data and the surface contact temperature measurement data are supplied and displayed by the display device 18.

Referring now to FIG. 5A, users 5 may access system 300 through computer systems 10. For example, in some embodiments, users 5 receive outputs from system 300. Users 5 may include any individual, group of individuals, entity, machine, and/or mechanism that interacts with computer systems 10. Examples of users 5 include, but are not limited to, a flight crew, a service person, pilot, engineer, technician, contractor, agent, and/or employee.

Computer system 10 may include processing units 12, input/output devices 14, communications links 16, and memory 17. In other embodiments, computer system 10 may include more, less, or other components. Computer system 10 may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processing units 12 represent devices operable to execute logic contained within a medium. Examples of processing unit 12 include one or more microprocessors, one or more applications, and/or other logic devices. Computer system 10 may include one or multiple processing units 12.

Input/output devices 14 may include any device or interface operable to enable communication between computer system 10 and external components, including communication with a user or another system. Example input/output devices 14 may include, but are not limited to, a mouse, keyboard, display, and printer.

In embodiments where wireless connections are used, a user 5 can be located remote to rotorcraft 100 may access and control any portion of system 300. Typically, control from a remote location would occur in the use of remote flying aircraft, such as unmanned aerial vehicles, for example, but are not so limited. Communication links 16 are operable to facilitate communication between computer system 10 and another element of a network, such as other computer systems 10. Communication links 16 may connect to any number and combination of wireline and/or wireless networks suitable for data transmission, including transmission of communications. Communication links 16 may, for example communicate audio and/or video signals, messages, internet protocol packets, frame relay frames, asynchronous transfer regime cells, and/or other suitable data between network addresses. Communication links 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 17 represents any suitable storage mechanism and may store any data for use by computer system 10. Memory 17 may comprise one or more tangible, computer-readable, and/or computer-executable storage medium. Examples of memory 17 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 17 stores logic management system 20. Logic management system 20 facilitates operation of computer system 10. Logic management system 20 may include hardware, software, and/or other logic. Logic management system 20 may be encoded in one or more tangible, non-transitory media and may perform operations when executed by a computer. Logic management system 20 may include a computer program, software, computer executable instructions, and/or instructions capable of being executed by computer system 10. Example logic management systems 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic management system 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

In another exemplary embodiment, shown in FIG. 6A, drive train 155 includes the tail rotor drive shaft 116 supported by drive shaft hanger bearings 117. In an embodiment, each of the drive shaft hanger bearings 117 is lubricated with grease. An embodiment of the system 300 can include fourth, fifth, and sixth non-contact temperature sensors 338*d*, 338*e*, 338*f* oriented to measure the surface temperatures of the respective hanger bearings 117. In an embodiment, the fourth non-contact temperature sensor 338*d* is disposed in the fuselage 130 in the mechanical area 132, the fifth non-contact temperature sensors 338*e* are disposed in the empennage 150, and a sixth non-contact temperature sensor 338*f* is disposed in the mechanical area 132 adjacent to the passenger area 131. In an embodiment, the system 300 includes surface contact temperature sensors (e.g., second surface contact sensors 343*b*) configured to measure the temperature of the hanger bearings 117. In some embodiments, both a non-contact temperature sensor 338 and a surface contact temperature sensor 343 are configured to monitor the temperature of a hanger bearing 117 (e.g., the fifth non-contact temperature sensor 338*e* and the second surface contact temperature sensor 343*b* measure the actual surface temperature of a hanger bearing 117).

This disclosure depicts and describes systems for monitoring the lubrication of a drive train and methods therefor. The systems for monitoring the lubrication of a drive train and methods described herein can be used with any aircraft having one or more rotor assemblies, including tiltrotor aircrafts, helicopters, tilt wing aircrafts, unmanned aerial vehicles (UAVs), hovercrafts, and other vertical lift or VTOL aircrafts, or can further be used with any device having one or more components having rotor assemblies, including devices with propellers, windmills, and turbines. Moreover, systems for monitoring the lubrication of a drive train and methods described herein can be used with other vehicles having a gearbox and/or other moving components requiring a lubrication system, including, but not limited to, automotive vehicles, pumps and other manufacturing equipment. Further, any features of one embodiment of the system 300 and methods therefor in this disclosure can be used with any other embodiment of the systems and components in this disclosure such that the other embodiment has the same or similar features, operates in the same or similar way, or achieves the same or similar functions. Some components of this disclosure are depicted by graphic shapes and symbols. Unless this disclosure specifies otherwise, such components should be understood to include the same or similar characteristics and features as those components that are named or described, though the graphic shapes and symbols may not depict each such characteristic or feature.

Practice of the invention is advantageous in that the systems and methods for monitoring the lubrication of the drive train improves operation of the aircraft during a loss of lubricant or lubricant failure situation over conventional systems. The systems and methods described herein can automatically provide an accurate gearbox temperature indication to the flight crew so that immediate corrective action can be taken before catastrophic gearbox failure. Moreover, in some embodiments, the systems and methods described herein can provide redundant indications of lubrication of the drive train including at least two of the following: a lubricant volume, a lubricant pressure, a contact temperature of the lubricant or ambient air, and a non-contact temperature indicating the actual surface temperature of the gearbox and/or one or more components therein. In addition, the system 300 can be integrated and retrofitted into existing flight systems on an aircraft. The systems and methods described herein are designed to achieve an improved technological result of improved safety and operation of an aircraft during a lubricant failure or loss event as compared to conventional industry practices.

It may be advantageous to set forth definitions of certain words and phrases used in this patent document. The terms "a" and "an" are defined as one or more unless this disclosure explicitly requires otherwise. Terms such as "first," "second," "third," and "fourth" are used only to differentiate features and not to limit the different features to a particular order or to a particular quantity. The term "substantially" is defined as largely, but not necessarily wholly, what is specified (and includes what is specified; e.g., substantially 90 degrees includes 90 degrees), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

Use of broader terms such as comprises, includes, and has (and any derivatives of such terms, such as comprising, including, and having) should be understood to provide support for narrower terms, such as consisting of, consisting essentially of, and comprised substantially of. Thus, in any of the claims, the term "consisting of," "consisting essentially of," or "comprised substantially of" can be substituted for any of the open-ended linking verbs recited above in order to change the scope of a given claim from what it would otherwise be using the open-ended linking verb.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. The feature or features of one embodiment may be applied to other embodiments to achieve still other embodiments, even though not described, unless expressly prohibited by this disclosure or the nature of the embodiments. The scope of protection is not limited by the description set out above but is defined by the claims that follow, the scope including all equivalents of the subject matter of the claims. Each and every claim is incorporated as further disclosure into the specification and the claims are embodiment(s) of the present invention.

What is claimed is:

1. A system to monitor lubrication of a drive train, comprising:
    a lubricant pressure sensor operable to detect a pressure of a lubricant in the drive train and configured to provide a lubricant pressure signal;
    a lubricant volume sensor operable to detect a volume of the lubricant in the drive train and configured to provide a lubricant volume signal;
    a non-contact temperature sensor operable to detect a temperature of a housing having moving components therein associated with the drive train and configured to provide a non-contact temperature signal; and
    a logic management system in communication with the lubricant pressure sensor, the lubricant volume sensor, and the non-contact temperature sensor; the logic management system being configured to:
        receive the lubricant pressure signal, the lubricant volume signal, and the non-contact temperature signal;
        classify the lubricant pressure signal into a normal pressure level or a predetermined minimum pressure level; and
        classify the lubricant volume signal into a normal volume level or a predetermined minimum volume level;
    wherein when the lubricant pressure signal reaches a predetermined minimum pressure level and the lubricant volume signal reaches a predetermined minimum volume level, the logic management system generates non-contact temperature measurement data corresponding to the non-contact temperature signal and supplies non-contact temperature measurement data to a display device.

2. The monitoring system according to claim 1, further comprising:
    a lubricant contact temperature sensor operable to detect a temperature of the lubricant in the drive train and configured to provide a lubricant contact temperature signal; and
    the logic management system in communication with the lubricant contact temperature sensor; the logic management system configured to receive and process the lubricant contact temperature signal;
    wherein when the logic management system supplies the non-contact temperature signal in the display device, the logic management system blocks the lubricant contact temperature signal to the display device.

3. The monitoring system according to claim 1, wherein the non-contact temperature sensor is a laser heat sensor.

4. The monitoring system according to claim 1, wherein the display device is disposed in a cockpit of a rotorcraft.

5. The monitoring system according to claim 1, wherein the display device comprises at least one of the following: a graphical user interface, a monitor, and a gauge.

6. The monitoring system according to claim 1, wherein the logic management system is disposed in a flight control computer.

7. A computer-implemented method for monitoring the lubrication of a drive train, the method being performed using one or more processing units in a logic management system, the method comprising:

receiving, by the one or more processing units, a lubricant pressure signal from a lubricant pressure sensor, the lubricant pressure sensor configured to detect a pressure of the lubricant in the drive train;

receiving, by the one or more processing units, a lubricant volume signal from a lubricant volume sensor, the lubricant volume sensor configured to detect a volume of the lubricant in the drive train;

receiving, by the one or more processing units, a non-contact temperature signal from a non-contact temperature sensor operable to detect a temperature of a housing having moving components therein associated with the drive train, the non-contact temperature sensor configured to detect a temperature of the housing;

classifying the lubricant pressure signal into a normal pressure level or a predetermined minimum pressure level via the one or more processing units;

classifying the lubricant volume signal into a normal volume level or a predetermined minimum volume level via the one or more processing units;

when the lubricant pressure signal reaches the predetermined minimum pressure level and the lubricant volume signal reaches the predetermined minimum volume level, generating, by the one or more processing units, non-contact temperature measurement data corresponding to the non-contact temperature signal; and supplying, by the one or more processing units, the non-contact temperature measurement data to a display device.

8. The computer-implemented method of claim 7, further comprising:

receiving, by the one or more processing units, a lubricant contact temperature signal from a lubricant contact temperature sensor, the lubricant contact temperature sensor configured to detect a temperature of the lubricant in the drive train;

wherein when the logic management system supplies a non-contact temperature signal in the display device, the logic management system blocks the lubricant contact temperature signal to the display device.

9. The computer-implemented method of claim 7, wherein the one or more processing units are configured to supply lubricant pressure measurement data corresponding to the lubricant pressure signal and lubricant volume measurement data corresponding to the lubricant volume signal to the display device during flight.

10. The computer-implemented method of claim 7, wherein the display device comprises at least one of the following: a graphical user interface, a monitor, and a gauge.

11. The computer-implemented method of claim 10, wherein the display device is disposed in a cockpit of a rotorcraft.

12. The computer-implemented method of claim 7, wherein the computer is a flight control computer.

13. A rotorcraft comprising:
a fuselage;
one or more rotor blades;
a drive train coupled to the fuselage and operable to rotate the rotor blades, the drive train comprising:
an engine;
a gearbox in mechanical communication with the engine;
a gearbox housing configured to encompass the gearbox; and
a lubrication system configured to deliver lubricant to the gearbox; and a monitoring system for the gearbox, the monitoring system comprising:
a lubricant pressure sensor operable to detect a pressure of the lubricant in the gearbox and configured to provide a lubricant pressure signal;
a lubricant volume sensor operable to detect a volume of the lubricant in the gearbox and configured to provide a lubricant volume signal;
a non-contact temperature sensor operable to detect a temperature of the gearbox housing and configured to provide a non-contact temperature signal; and
a logic management system in communication with the lubricant pressure sensor, the lubricant volume sensor, and the non-contact temperature sensor, the logic management system being configured to:
receive the lubricant pressure signal, the lubricant volume signal, and the non-contact temperature signal;
classify the lubricant pressure signal into a normal pressure level or a predetermined minimum pressure level; and
classify the lubricant volume signal into a normal volume level or a predetermined minimum volume level;
wherein when the lubricant pressure signal reaches a predetermined minimum pressure level and the lubricant volume signal reaches a predetermined minimum volume level, the logic management system generates non-contact temperature measurement data corresponding to the non-contact temperature signal and supplies non-contact temperature measurement data to a display device.

14. The rotorcraft according to claim 13, wherein the non-contact temperature sensor is a laser heat sensor.

15. The rotorcraft of claim 13, wherein the drive train further comprises a drive shaft in mechanical communication with the engine; wherein the monitoring system further comprises:
a surface contact temperature sensor operable to detect a temperature of the drive shaft and configured to provide a surface contact temperature signal;
wherein the logic management system is in communication with the surface contact temperature sensor, the logic management system being configured to receive and process the surface contact temperature signal;
wherein the logic management system supplies surface contact temperature measurement data corresponding to the surface contact temperature signal in the display device.

16. The monitoring system according to claim 1, wherein the housing having moving components therein comprises a housing having bearings and/or gears therein.

17. The monitoring system according to claim 16, wherein the housing having bearings and/or gears therein comprises a gearbox housing with bearings and gears therein.

18. The monitoring system according to claim 16, wherein the housing having bearings and/or gears therein comprises a housing for a hanger bearing.

19. The monitoring system according to claim 1, wherein the non-contact temperature sensor is configured to detect the temperature of a top surface, a bottom surface, and/or a side surface of the housing.

20. The computer-implemented method according to claim 7, wherein the housing having moving components therein comprises a housing having bearings and/or gears therein.

21. The computer-implemented method according to claim 20, wherein the housing having bearings and/or gears therein comprises a gearbox housing with bearings and gears therein.

22. The computer-implemented method according to claim 20, wherein the housing having bearings and/or gears therein comprises a housing for a hanger bearing.

23. The computer-implemented method according to claim 7, wherein the non-contact temperature sensor is configured to detect the temperature of a top surface, a bottom surface, and/or a side surface of the housing.

24. The rotorcraft according to claim 13, wherein the non-contact temperature sensor is configured to detect the temperature of a top surface, a bottom surface, and/or a side surface of the gearbox housing.

\* \* \* \* \*